Patented May 27, 1941

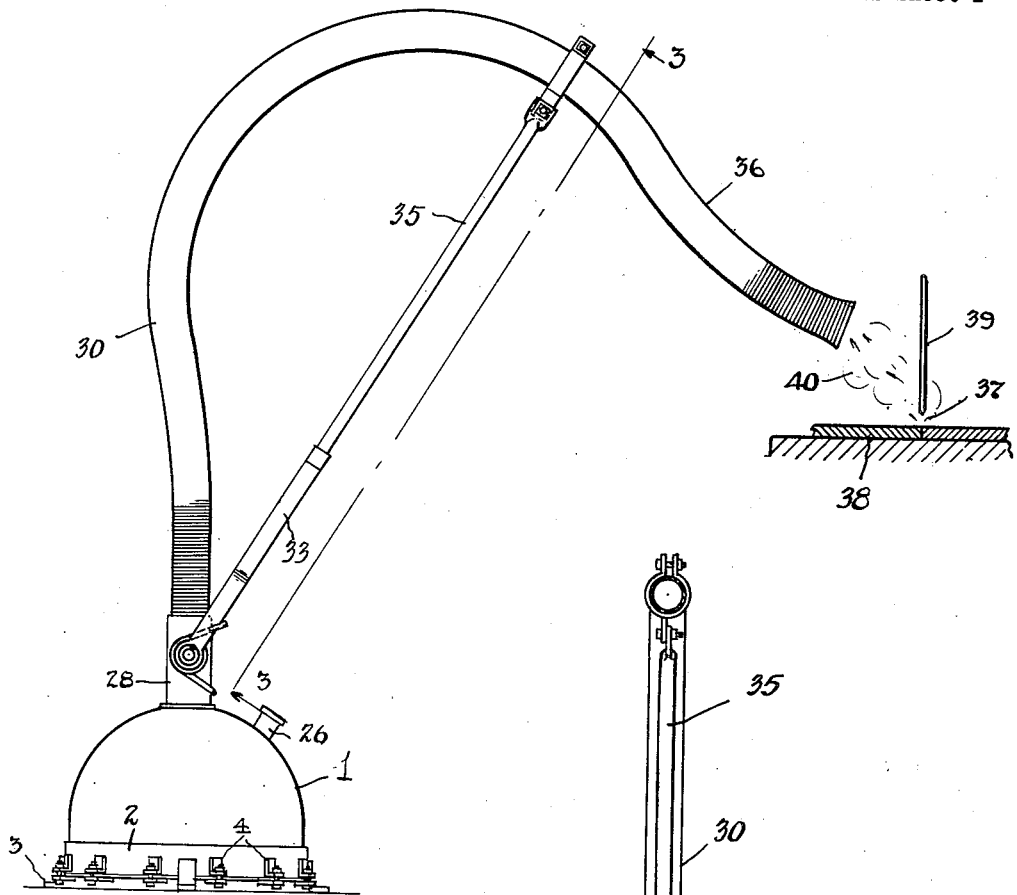
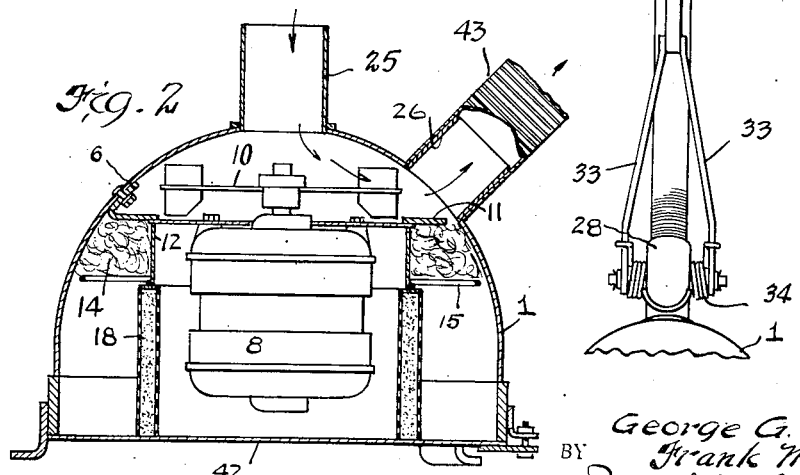

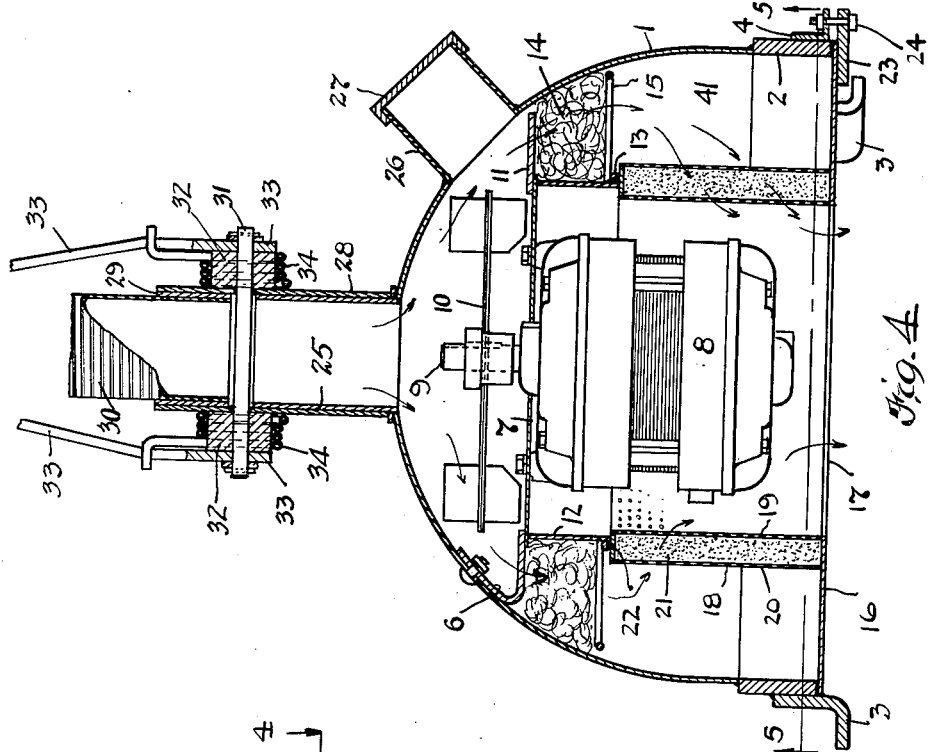

2,243,637

UNITED STATES PATENT OFFICE 2,243,637

AIR CONDITIONER

George G. Landis, University Heights, and Frank Mainer, Cleveland, Ohio, assignors to The Lincoln Electric Company, Cleveland, Ohio, a corporation of Ohio Application November 19, 1937, Serial No. 175,534

2 Claims. (Cl. 183—36)

This invention relates as indicated to improvements in air conditioners and more specifically to air conditioners for use in industrial operations and the like in which it is necessary or desirable to carry away the gases generated in connection with the particular operation.

More specifically, this invention relates to air conditioners which may be employed in conjunction with operations such as electric arc welding, which air conditioners are adapted to carry away from the vicinity of the welding arc the gases generated by the welding operation and which are unpleasant to the operator.

It is a principal object of our invention, therefore, to provide an air conditioning device of the character described which may be employed by an arc welding operator, for example, with a minimum of inconvenience to him during the arc welding operation and which, at the same time, is effective to remove the gases from the vicinity of the arc and to either properly dispose of the same or remove therefrom the objectionable constituents.

Other objects of our invention will appear as the description proceeds.

To the accomplishment of the foregoing and related ends, said invention, then consists of the means hereinafter fully described and particularly pointed out in the claims.

The annexed drawings and the following description set forth in detail certain means and one mode of carrying out the invention, such disclosed means and mode illustrating, however, but one of various ways in which the principle of the invention may be used.

In said annexed drawings:

Fig. 1 is a side elevational view of one form of apparatus constructed in accordance with the principles of our invention; Fig. 2 is a transverse sectional view of a portion of the apparatus illustrated in Fig. 1; Fig. 3 is a transverse sectional view of a portion of the apparatus illustrated in Fig. 1 taken on a plane substantially indicated by the line 3—3; Fig. 4 is a view similar to Fig. 2, but showing the parts somewhat differently arranged and drawn to a larger scale; Fig. 5 is a transverse sectional view of the apparatus illustrated in Fig. 4, taken on a plane substantially indicated by the line 5—5; and Fig. 6 is a fragmentary side elevational view of the connection between the flexible conduit and suction unit forming the components of the apparatus illustrated in the previous figures.

Referring now more specifically to the drawings and more especially to Fig. 4, the apparatus here illustrated consists of a hemispherical shell 1, to which is secured an equatorial band and which serves as a means for supporting and strengthening the shell, the latter usually being made of sheet metal. The ring 2 is provided with a plurality of angle-shaped legs 3 secured thereto, four of such legs being provided as illustrated in Fig. 5.

Likewise secured to the ring 2 are a plurality of circumferentially spaced lugs 4, twelve such lugs being provided as illustrated in Fig. 5.

Secured to the inside shell 1 are four supporting brackets 6, these serving as a means of support for a plate 7 on which is hung a motor 8. The shaft 9 of the motor extends upwardly through the plates 7 and on such shaft is mounted a blower fan 10. The plate 7 which is imperforate has four spacer bars secured thereto respectively at points mid-way between the supporting brackets 6. Secured to and extending downwardly from the plates 7 is an imperforate annular band 12 to the lower outer edge of which there is secured a ring 13.

An annular filter element, generally indicated at 14, is interposed between the shell 1 and the ring 12 underneath the spacer bars 11 and brackets 6, the latter holding such material from moving upwardly within the shell above the level of the plate 7.

The filter element 14 is secured in place by means of a deformed wire snap-ring 15 which, in its normal position, contracts against the outer periphery of the annular member 12 above the ring 13, which holds the deformed ring 15 and consequently, the filter element 14, in place.

Extending across the lower face of the ring 2 is an annular plate 16 which is provided with a central opening 17. Mounted on the upper face of the plate 16 and bordering the opening 17 is an annular filter element generally indicated at 18 which consists of perforated inner and outer walls 19 and 20 respectively with a space between such walls filled with a suitable filter media 21. The annular plate 22 closing the top of this axially extending annular filter unit 18 is imperforate and preferably removable so as to facilitate replacement of the filter media 21.

The annular plate 16 is provided with a plurality of radially extending lugs 23 secured thereto in the same spaced relation as the lugs 4 on the ring 2. These cooperating lugs are provided with aligned holes for the reception of securing means such as bolts 24.

The shell 1 is provided with an upwardly directed tubular extension 25 and a laterally directed tubular extension 26. The tubular extension 26, when the unit is employed as a filter, will be normally closed by means such as a cap 27.

Mounted over the tubular extension 25 and rotatable with respect thereto is a thimble 28, the upper end of which is provided with an internal bushing 29 to which is secured the lower end of a flexible tube 30. A pin 31 extends through the thimble 28 just above the upper end of the tubular extension 25. On its ends this pin 31 carries spacers 32 and outside of such spacers the lower ends of upwardly extending arms 33.

Mounted on the spacers 32 are coil springs 34 with one end of each of such springs in engagement with the thimble 28 and the opposite ends of such springs in engagement with the arms 33. These springs are so mounted that they tend to cause the arms 33 to rotate in a counterclockwise direction as viewed in Fig. 1.

It will be seen from an inspection of Fig. 4 that the tube 30 with its associated arms 33 and supporting thimble 28 may be rotated freely with respect to the tubular projection 25. At this point it should also be noted that the inside diameter of the flexible tube 30 is the same as the outside diameter of the tubular projection 26 and that the flexible tube 30 may be lifted out of the bushing 29 and moved over onto the tubular projection 26.

Such substitution may be made for certain types of operation as hereinafter more fully explained.

The flexible tube 30 is of such construction that a very light weight, relatively thin-walled hollow tube is provided. This tubing may be conveniently described as the type employed for use as airplane engine manifolds but provided, however, with a continuous wire or ribbon formed of suitable material such as asbestos, copper, steel, bronze, etc. interwoven with the turns thereof to increase the frictional resistance between separate turns of the tube so that it is substantially self-supporting and a substantial length of the same may be projected into space without the necessity of a support for the terminal thereof.

In order to further insure, however, that the flexible tube 30 will be retained in the desired position, the same may be supported intermediately of its ends by the bracket member 35 which is carried by the upper ends of the arms 33. A substantial length of the flexible tube extends beyond the bracket 35 as at 36 in Fig. 1.

The function and operation of the above described form of apparatus may be briefly explained by having reference to Figs. 1 and 4.

The air conditioning unit including the casing 1 and the parts contained therein is positioned on any suitable level such as the floor adjacent a station at which, for example, an electric welding arc 37 is maintained between the work 38 which is to be welded and an electrode 39 presented in arcing relation thereto. The operator at the welding station may, by merely grasping the unsupported end 36 of the flexible tubing, move the same into position closely adjacent the place where the arc is to be maintained. The tube will remain in such position and when the motor 8 is energized to draw air through the tube 30, will cause the noxious gases generally indicated at 40, which are generated in the vicinity of the welding arc, to be drawn into the adjacent end of the tube 30. These noxious gases pass through the tube 30 until they reach the fan chamber in the casing 1, where they are caused to flow downwardly through the annular filter member 14 into the annular space generally indicated at 41. From the space 41 the gases pass radially inwardly through the annular filter member 18 and thence downwardly through the central opening 17 in the plate 16.

The filter element 14 may be any conventional form of mechanical filter unit, i. e., a unit which removes by mechanical filtration the solid particles or substantially all of the solid particles contained in the gases passing therethrough. A mechanical filter unit of bronze wool is preferred, since such material will not rust or similarly deteriorate as is the case with steel wool; nor does it have a tendency to injure the hands of the workman installing and removing the same which is an objectionable feature of materials such as steel wool, glass wool, etc.

The filter media 21 included in the filter unit 18 is preferably activated carbon so that it will absorb the chemical vapors if there be any in the gases led away from the welding operation.

When operated in the manner above explained, the air conditioner comprising our invention is effective to lead away from the vicinity of the welding arc substantially all of the gases produced by the welding operation. By successively passing such gases through separate filters which mechanically and chemically remove the impurities therefrom, the resultant air may be safely discharged into the room occupied by the workman.

In certain types of installation it may be found desirable, instead of filtering the gases, to directly discharge the same outside of the building. This may be accomplished by substituting a solid plate 42, as illustrated in Fig. 2, for the annular plate 16, as illustrated in Fig. 4, and by removing the cap 27 from the tubular extension 26 and connecting an outfall conduit 43 to such extension.

When the parts are thus arranged as illustrated in Fig. 2, the gases drawn through the tube 30 and downwardly through the tubular extension 25 will, instead of passing downwardly through the casing and being filtered, be discharged laterally by the fan 10 into and through the outfall conduit 43 which may be connected either to a suitable header or extend directly out of the building housing the apparatus.

While the filter units 14 and 18 have been shown retained in the structure illustrated in Fig. 2, obviously it is not necessary to include such filters if the apparatus is merely to be used as a means for discharging the gases collected thereby through an outfall manifold to the outside of the building.

It frequently occurs that a welding operator is required to work on the inside of a tubular vessel and it has been found that the air conditioner comprising our invention may be most effectively used in conjunction with such welding operation by converting the same into a blower rather than by attempting to evacuate the gases from the interior of the tubular vessel where the welding operation is being carried on. The device comprising our invention may be converted into a blower by moving the flexible tube 30 over onto the tubular extension 26 in the manner previously explained. This will cause the fan 10 to draw air into the casing through the tubular extension 25 and force the same out through the tubular extension 26 and the flexible tube 30. When the tube 30 is then led into one end of the tubular vessel or similar article being welded, it will cause all of the gases generated by the welding operation to be blown out of the other end thereof. In this way the gases produced by the welding operation are removed just as effectively as if an attempt were made to lead them away from the welding operation by suction.

The apparatus comprising our invention, due to the nature of its construction and the flexibility of its operation, may be employed for a wide variety of uses which will become apparent to those familiar with the art, so that they need not be enumerated at this point.

It will be observed that instead of having the flexible tubing which extends into the immediate vicinity of the welding operation extend all the way back to the air conditioning unit, such unit may be connected to a header to which may be connected a plurality of separate flexible tubes capable of serving a corresponding number of welding stations. In other words, a single header may extend along a plurality of welding stations and when properly stepped down in the manner well known to those familiar with the art, in order that the separate tubes connected thereto may all draw evenly, separate flexible conduits may be connected to such header to lead the gases away from the several welding stations. The important feature of any such construction, as illustrated herein and previously described, is that the flexible tube which extends to the station where the gases are to be removed shall be capable of easy manipulation, i. e., it shall be flexible so that the operator may, with a minimum of effort, move the same to the desired location. Such tube shall also possess the property of remaining in the position to which the operator has thus moved it. In order to be capable of serving this function, the flexible tube must be so constructed that a substantial length of the same may extend into space in any desired direction and remain in such position without any external support. In the light of the previous description it will be observed that when a header serving a plurality of separate suction tubes is employed, such header may be either led directly out of the building where the gases collected thereby are exhausted or to any suitable form of conditioning device.

Other modes of applying the principle of our invention may be employed instead of the one explained, change being made as regards the means and the steps herein disclosed, provided those stated by any of the following claims or their equivalent be employed.

We, therefore, particularly point out and distinctly claim as our invention:

1. In an air cleaning device, a casing having a chamber provided with an air inlet, a second casing provided with an air outlet, an annular third chamber arranged coaxially with said second chamber, a relatively coarse filter arranged across one end of said annular chamber and through which the air passes from said first to said third chambers, a relatively fine filter included in the lateral wall separating said second and third chambers, and a blower for moving the stream of air to be treated successively through said first, third and second chambers and successively through said coarse and fine filters.

2. In an air cleaning device, a casing having a chamber provided with an air inlet, a second casing provided with an air outlet, a third annular chamber surrounding said second chamber, a relatively coarse filter, of a material of the type represented by bronze wool, arranged across one end of said annular chamber and through which the air passes from said first to said third chambers, a relatively fine filter, of a material of the type represented by activated carbon, comprising the lateral wall separating said second and third chambers, and a blower for moving the stream of air to be treated successively through said first, third and second chambers and successively through said first, third and second chambers and successively through said coarse and fine filters.

GEORGE G. LANDIS.
FRANK MALNER.